United States Patent [19]

Falco

[11] Patent Number: 4,886,188

[45] Date of Patent: Dec. 12, 1989

[54] COMBINATION MANUAL OR IMPACT DRIVE ENHANCEMENT OF PORTABLE INJECTION TOOL

[76] Inventor: Gene A. Falco, 34 Windemere Way, Woodbury, N.Y. 11797

[21] Appl. No.: 121,287

[22] Filed: Nov. 16, 1987

[51] Int. Cl.[4] .......................... B67B 7/00; G01F 11/00

[52] U.S. Cl. .......................................... 222/1; 222/333; 222/390

[58] Field of Search .................. 173/29; 222/390, 333, 222/1

[56] References Cited

U.S. PATENT DOCUMENTS

| | | | |
|---|---|---|---|
| 4,149,820 | 4/1979 | Newlin | 81/185 X |
| 4,258,866 | 3/1981 | Bergman | 222/390 X |
| 4,322,022 | 3/1982 | Bergman | 222/290 X |

*Primary Examiner*—Donald R. Schran
*Assistant Examiner*—James L. Wolfe
*Attorney, Agent, or Firm*—Bauer & Schaffer

[57] ABSTRACT

Adhesive is delivered to a work site by providing said component in a cartridge having an orifice at one end and a slideable plunger at the other end. An axial force is applied against the plunger, intermittently pushing the adhesive from the cartridge. The force is applied by an impact wrench producing slow speed, moderate to high torque, and limited duration of force.

3 Claims, 1 Drawing Sheet

COMBINATION MANUAL OR IMPACT DRIVE ENHANCEMENT OF PORTABLE INJECTION TOOL

BACKGROUND OF THE INVENTION

The present invention relates to a method and apparatus for delivering various adhesives, in situ, to blind holes, fissures, voids, and similar gaps found in masonry construction.

Illustrative of the need for delivering various adhesive, is the system disclosed in my earlier application Ser. No. 135,662, filed Dec. 21, 1987, and Ser. No. 242,952, filed Sept. 9, 1988, wherein stone or other masonry facia was bonded to concrete supporting the underlayer by setting a hollow elongated porois sleeve in a blind bore extending through masonry. The sleeve is filled with adhesive, and an anchoring pin is mounted in the adhesive to push an amount of the adhesive radially outward of the sleeve.

In other applications, the adhesive is inserted without a sleeve and directly into cracks, gaps or spaces of various kinds.

In general, the introduction of the adhesive is best accomplished by extruding the adhesive from a cartridge into the space or gap, rather than by lapping, troweling or smearing. Since most spaces, gaps, etc., which are to be filled are relatively small, i.e., narrow or thin and constitute blind areas trapping air or liquid, a degree of pressure is required to force all of the air or moisture from the hole or space so that the viscous adhesive fills the void therein completely and fully. This problem, peculiar to filling blind holes, fissures or the like, is not easily overcome by the known cartridge extrusion means.

The commonly known cartridge drive systems were derived from caulking devices, glue spreaders and the like, adapted for free and open dispensing. Each of these systems depend upon pushing at the rear end of the cartridge to force the flowable adhesive out of a nozzle at its forward end. The failure to maintain the constant pressure results in loss of mobility i.e. flowability of the adhesive. However, this is generally of no consequence, since the adhesive can also be trowelled and spread if inadequate and delivered by the cartridge. Thus, the use of manually operative drive means, as in my aforementioned patent application, or the use of a constant rotary electrical (drill type) drive means as described in, Bergman, U.S. Pat. No. 4,258,866 are attempts at obtaining more efficient extrusion. It has been found, however, that only a less strenuous delivery was obtained but not a more efficient delivery.

The manual drive means requires excessive strength to produce slow crank speed and relatively moderate torque. The known power drill drive produces excessive speed and relatively low torque.

It has been found that optimum crank speed can be provided together with optimum torque thereby improving the delivery of viscous adhesive to blind hole sites and the like.

SUMMARY OF THE INVENTION

According to the present invention, a method and apparatus for delivering adhesive to a work site is provided comprising the steps of providing said component in a cartridge having an orifice at one end and a slideable plunger at the other end. An axial force is applied against the plunger intermittently, pushing the adhesive from the cartridge. The force is applied by an impact wrench producing slow speed, moderate to high torque, and limited duration of force.

Full details of the present invention are set forth in the following disclosure and illustrated in the accompanying drawings.

DESCRIPTION OF THE INVENTION

Figure 1:
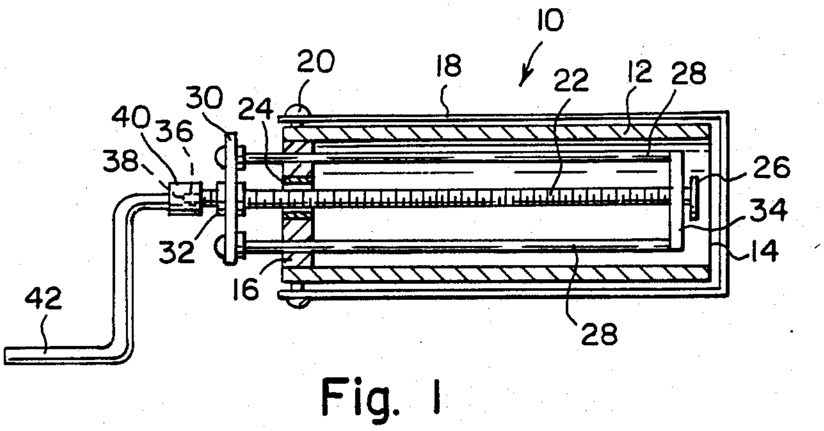
FIG. 1 is a side elevational view of an extrusion tool employed in the present invention.
Figure 2:
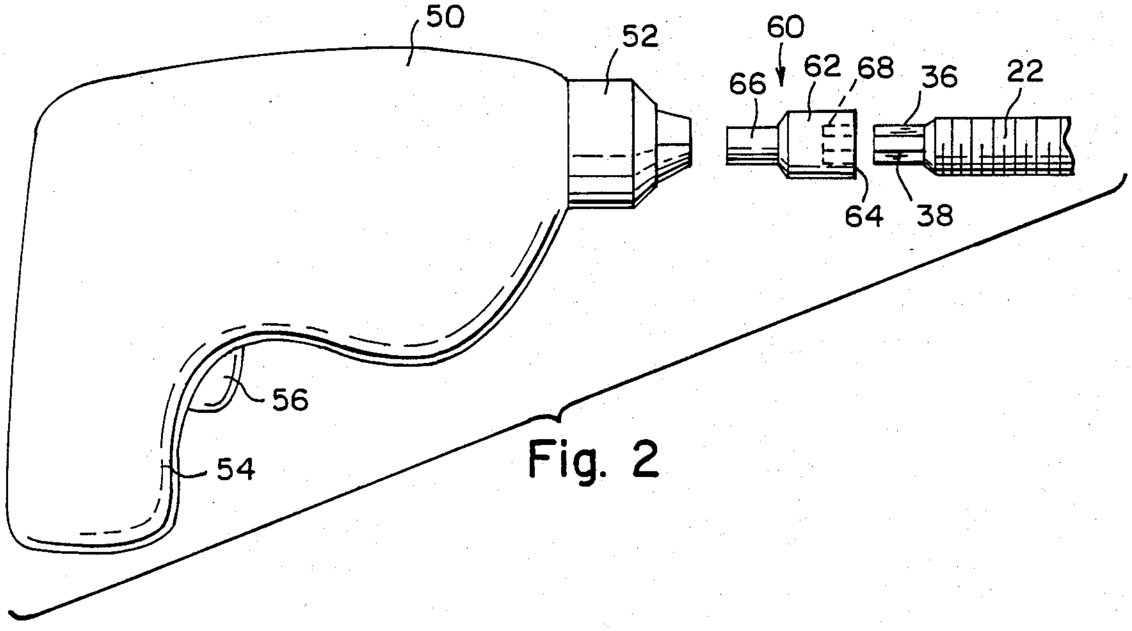
FIG. 2 is an exploded view of an impact wrench and connecting adaptor a used in the present invention.

As seen in FIG. 1, the apparatus and system of the present invention are simply illustrated in the provision of a screw driven extrusion tool for a single cartridge. The tool generally depicted by the numeral 10 comprises a cylindrical body 12, open at its forward end 14, secured firmly at the rear end to a closing wall 16. In the illustrated tool a surrounding cage 18 is bolted by suitable bolts or the like 20 to the cylinder body 12 and the back wall 16 simultaneously.

An elongated screw 22 passes through a non-threaded bushing 24 fixed to the center of the back wall 16 and terminating at its forward end in a cap 26. Extending freely parallel to the drive screw 22 and rearwardly through the back wall 16 are a plurality of rods 28 uniformly spaced about the drive screw 22. The rods are fixed to a plate 30 at its rear end, passing freely through the plate 16 and meshing with a threaded bushing 32 so that rotation of the screw 16 causes the plate 30 to axially reciprocate. The rods 28 are fixed at their forward ends to another plate 34 freely moving over the screw 16. The rear end 36 of the drive screw 32 is provided with a hexagonal head 38 to which the socket 40 of a manual handle 42 is normally attached.

The extrusion tool 10 is adapted to receive into its open forward end a cylindrical cartridge containing the desired viscous adhesive. The cartridge has a nozzle at its forward end and a movable wall at its rear end adapted to abut against the front wall 26 of the screw driven frame. The cartridge is not illustrated, since it is well known, conventional and freely available in the open market. Rotation by operation of the handle 42 of the drive screw 22 moves to plate 26 forward extruding the adhesive.

In most applications the use of a manual crank handle has the disadvantage that periodically, as the cranking is stopped, the pressure on the adhesive material is reduced, and the adhesive begins to flow out (back flow), and the movement into the gap or fissure is reduced. A similar drawback is found in the use of ordinary electric drill as the drive means.

According to the present invention, the ability to provide and introduce the adhesive material to the site, i.e., fissure, gap, crack, or the like, is greatly enhanced by providing power drive comprising an impact wrench 50 by which intermittent rotary movement is impacted to the drive screw.

The impact wrench 50 has a forward end provided with a chuck 52 to grasp a shaft therein, a handle grip 54 at its rear end so that it can be easily held, and an electrically driven motor provided with a trigger 56 contained therein. The impact wrench provides moderate to high torque, slow speed, and intermittent rotary movement without reduction in forward pressure when stopped.

As an example of an impact wrench, a Hitachi WH8DA cordless, electric, impact driver may be used. Other similar impact drivers are conventional and fully available.

In order to mate the impact wrench to the drive shaft, it is preferable to provide an adaptor 60 whereby any impact wrench can be connected to any cartridge drive tool. The adaptor 60 comprises a body having a hollow head 62 open at one end 64 and closed at its other end by an extending shaft 66. The inner surface of the head 62 is cut into a hexogonal shape to form a socket 68 conforming in shape to that of the end 38 of the drive screw 22. The extending shaft 66 is a solid cylinder adapted to fit within the chuck 52 of the impact wrench 50. The shaft 66 may be landed or shaped, if desired, to improve its grasping connection with the chuck.

As will be obvious, the present invention is a significant enhancement of portable fluid injection equipment. A normally screw-driven manual tool need not be altered from its design as a screw-driven tool while the user also has the option of applying impact drive (via standard impact wrench or impact drive). The impact feature and the ability to interchange drive methods are not obvious aspects and are significant improvements over existing equipment. The use of impact drive in this application is not obvious for two major reasons: first, this type of extrusion tool 10 requires slow crank rotation at operating condition with moderate torque. Therefore, high torque is not the reason for choosing impact drive, slow rotation is the reason; and second, the impact drive gives operator better control through the advantage of lower moment forces transmitted to his hand. Another advantage is that with an impact wrench, ramp up speed, i.e., from stop to operating condition, is more easily and quickly accomplished.

In certain applications involving the required dispensing of fluids under pressure, such as during anchor grouting, crack injection, and void filling, it may still be helpful to the overall performance of the installation to use manually driven or portable injection tools. Until now, these tools have been pneumatic or manually screw-driven. The present design incorporates a removeable crank handle on the screw-driven tool in a manner which, when removed, accommodates impact wrenches directly. Impact wrenches may be cordless, pneumatic, or electric. The overall result of this invention is to create a more durable, easier to maintain, less expensive, and more widely useable piece of equipment.

Therefore, the present invention provides a new and more marketable tool for the installation of injectable fluids such as two-part epoxies, two-part polyesters, or one-part substances such as latex caulks, urethane caulks, and silicones. When compared, for example, to the combination of an extrusion tool, with a continuous drive such as the conventional $\frac{1}{4}$ or $\frac{1}{2}$ inch drill, impact wrench is capable of providing slow speed, regulated speed, and correspondingly increasing torque, thereby insuring absolute filling of even the smallest and most remote fissures or holes.

A separate adaptor for the crank handle may be provided with each extrusion tool, as sold, onto which the mating end is firmly attached to the drive end of the crank handle. The hex adaptor is chosen to mate directly to standard power impact wrenches without additional accessories. By simply pulling off the removable crank handle, the operator exposes the aforementioned hex end or which he can thus place the adaptor, which mates directly with standard power impact wrenches. Thus, he has converted a manual tool into a power tool literally in seconds.

The shape of the adaptor and its socket may be changed to any other compatible shape, such as square drive, threaded drive, etc. The adaptor may be accomplished using any other means such as welding solid construction to provide a unitary or integral construction.

Various modifications, changes, and embodiments have been described, and others will be obvious to those skilled in the art. Therefore, it is intended that the present disclaimer be taken as illustrated and not as limiting of the prior art.

I claim:

1. A method for delivering an adhesive system to a work site, comprising the steps of providing said adhesive system in a cartridge having an orifice at one end and a slideable plunger at the other, applying an axial force intermittently against said slideable plunger to push the adhesive system from said cartridge, said force being intermittently applied by an impact wrench.

2. Apparatus for delivering adhesive to a masonry system comprising an extrusion tool for emptying a cartridge type container having a nozzle at one end and a plunger at the other, said tool having a drive screw for applying an axial force against said plunger and an impact wrench for intermittently applying rotation to said drive screw.

3. An adaptor for connecting the drive screw and impact wrench of claim 2 wherein said drive screw is provided with a polygonal end, said adaptor comprising an axial body having a head at one end and a shaft at the other end, said head having a polygonal recess conforming to the polygonal end of said drive screw, and said shaft having a shaped recess for insertion on said impact wrench.

* * * * *